United States Patent
Lundy et al.

(10) Patent No.: US 6,912,545 B1
(45) Date of Patent: Jun. 28, 2005

(54) LOCATION-CODE SYSTEM FOR LOCATION-BASED SERVICES

(75) Inventors: Michael T. Lundy, Olathe, KS (US); Robert R. Moritz, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 09/879,322

(22) Filed: Jun. 12, 2001

(51) Int. Cl.[7] .............................................. G06F 17/30
(52) U.S. Cl. ................................................... 707/104.1
(58) Field of Search ..................................... 707/104.1

(56) References Cited

U.S. PATENT DOCUMENTS

| | | | | |
|---|---|---|---|---|
| 6,091,956 A | * | 7/2000 | Hollenberg | 455/456.5 |
| 6,202,023 B1 | * | 3/2001 | Hancock et al. | 701/201 |
| 6,236,365 B1 | * | 5/2001 | LeBlanc et al. | 342/457 |
| 6,249,252 B1 | * | 6/2001 | Dupray | 342/450 |
| 6,529,723 B1 | * | 3/2003 | Bentley | 455/405 |
| 6,539,080 B1 | * | 3/2003 | Bruce et al. | 379/88.17 |
| 2002/0023109 A1 | * | 2/2002 | Lederer et al. | 707/511 |
| 2002/0057678 A1 | * | 5/2002 | Jiang et al. | 370/353 |
| 2002/0059148 A1 | * | 5/2002 | Rosenhaft et al. | 705/77 |
| 2002/0120554 A1 | * | 8/2002 | Vega | 705/37 |
| 2003/0006911 A1 | * | 1/2003 | Smith et al. | 340/573.531 |
| 2003/0014342 A1 | * | 1/2003 | Vande Pol | 705/36 |
| 2003/0031334 A1 | * | 2/2003 | Layton et al | 381/310 |

* cited by examiner

*Primary Examiner*—Wayne Amsbury

(57) ABSTRACT

A location-code system provides user-specific location codes corresponding to locations. A user can provision the codes. When the user accesses a location-based service, the user can then provide the service with a location code. The service, perhaps with the assistance of a location-code provider, can then translate the user-specific location code into location coordinates that can be used to facilitate a location-based service. Further, the location-code system can provide global, or generic, location-codes for particular locations, which any user can use as a basis to indicate a location.

19 Claims, 3 Drawing Sheets

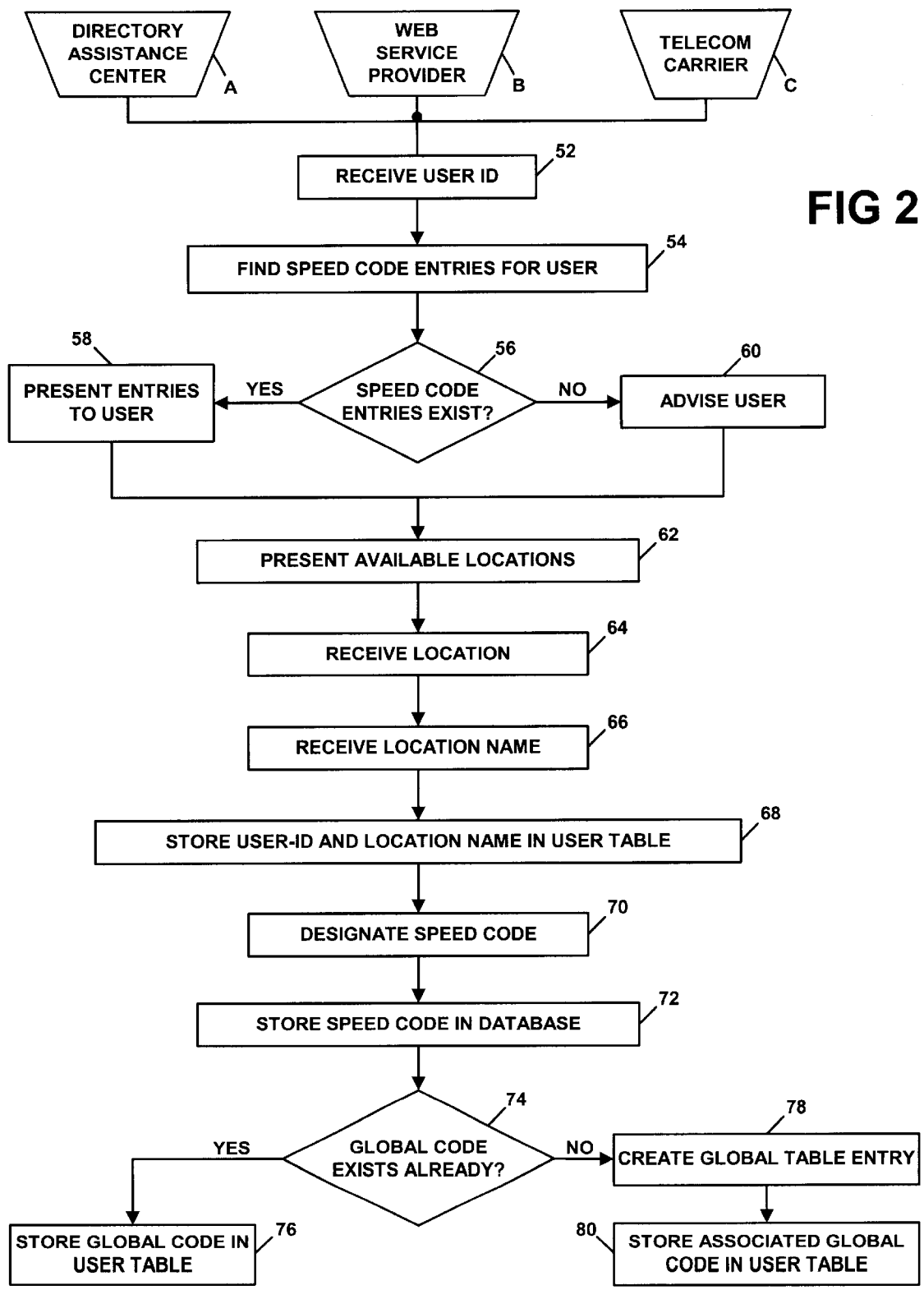

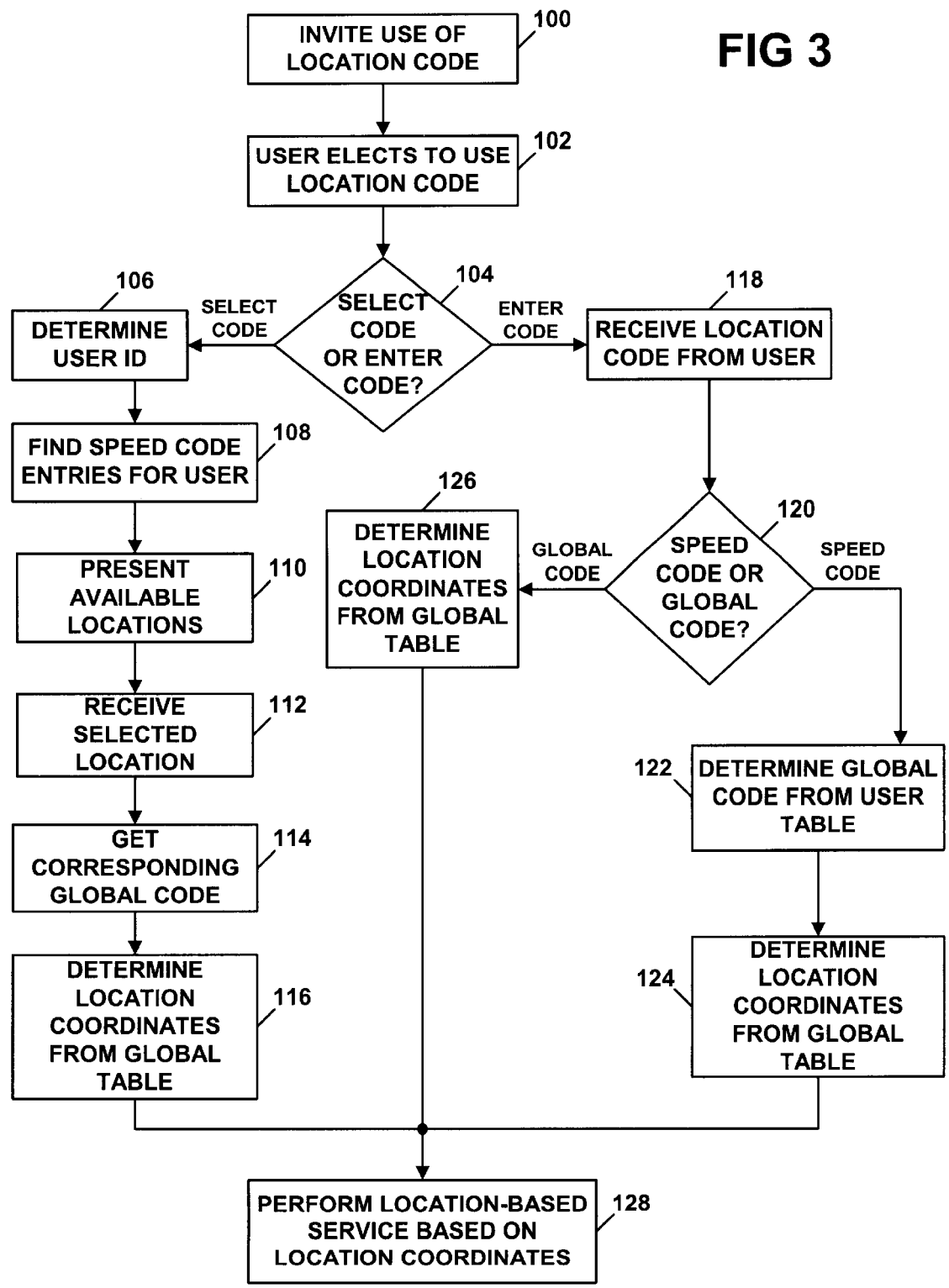

LOCATION-CODE SYSTEM FOR LOCATION-BASED SERVICES

BACKGROUND

1. Field of the Invention

The present invention relates to location-based services and, more particularly, to a method and system for providing an indication of location, so as to facilitate operation of such services.

2. Description of Related Art

Recent growth in telecommunications has ushered in a new era of convenience and productivity. One of the results of this growth, and particularly the growth of wireless communications, has been an increased demand for location-based services.

Examples of such services include mapping, navigation (directions), and weather and traffic reporting. For instance, given the location of a user, a location-based-service provider can invoke a mapping routine in order to provide the user with a map of the user's geographical area. As another example, given a user's current location and a destination location, a location-based-service provider can invoke a navigation routine in order to provide the user with directions to travel from the current location to the destination location. Further, the location-based-service provider can invoke a weather reporting routine so as to provide the user with a weather report for the destination location.

In some cases, when a user contacts a location-based-service provider from a communication terminal, it is possible for the service provider to determine the user's location by determining the location of the communication terminal. This has long been the case with landline terminals, such as telephones, which are associated with fixed addresses. More recently, this has also become possible with mobile terminals, such as cellular telephones for instance.

However, in many cases, a user may wish to designate a particular location, so as to allow the service provider to perform a location-based service with respect to the location. This may be the case, for instance, if the user wants to invoke a location-based service with respect to a location other than the user's current location, or if the service provider is otherwise unable to determine the location.

A need therefore exists for a mechanism of communicating a location to a service provider, so as to allow the service provider to perform a service based on that location.

SUMMARY

The present invention provides a mechanism for managing location information. The mechanism involves establishing user-specific location-codes for particular locations, and then using those codes as a basis to facilitate location-based services for a user.

In accordance with an exemplary embodiment, each user (or group of users, such as individuals within a particular office, company or organization) will have a set of (one or more) user-specific location-codes, which may be referred to as "speed codes." Each speed code could be a character string, such as a combination of numbers, letters and/or other symbols.

A database system will associate each speed code with a user, such as by correlating a user ID with the speed code, and will associate each speed code with a particular location (such as the latitude/longitude coordinates the location). For instance, the database could associate each speed code with a global location code and could then associate each global code with a particular location. The speed code would thus function to identify the location for a given user or group of users, while the global code would function to identify the location generally for anyone.

In the exemplary embodiment, the database system will further specify a plaintext name for the location, so as to describe the location in a way that is readily understandable to a user. The database may also include other information as well.

A user or other entity will provision the database with speed codes for locations of interest to the user. In turn, when the user accesses a location-based service, the user will specify a location by specifying the user's speed code for the location. Alternatively, the user could specify the global code for the location. The location-based service will then reference the database (or cause another entity to reference the database) so as to determine the location coordinates that correspond to the speed code or global location code. The location-based service will then perform a service based on those location coordinates.

Thus, an exemplary embodiment may take the form of a method of establishing a location code for use in facilitating a location-based service. Such a method can involve receiving a request from a user to establish a location code, and establishing a connection (e.g., a network connection) between the user and a location-code provisioning system. When establishing the connection with the provisioning system, the method may further involve giving the provisioning system an indication of the location. The method can also involve establishing in a database system (i) a first relationship between a first location code and a user (e.g., user ID) and (ii) a second relationship between the first location code and a location. That way, the database can be queried based on a combination of the location code and user to produce an indication of the associated location.

Further, an exemplary embodiment may take the form of a method of determining a location for use in a location-based service. Such a method could involve receiving a location code, querying a database system to determine (i.e., to find) a location corresponding to the location code, and then outputting an indication of the location. More particularly, the method could involve receiving the location code from a location-based service, and, after referencing the database system, providing the location-based service with an indication of the corresponding location.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 2 is a flow chart depicting a set of functions involved with provisioning speed codes according to the exemplary embodiment; and FIG. 3 is a flow chart depicting a set of functions involved with using speed codes according to the exemplary embodiment.

DETAILES DESCRIPTION OF AN EXEMPLARY EMBODIMENT

1. Exemplary Architecture

Figure 1:
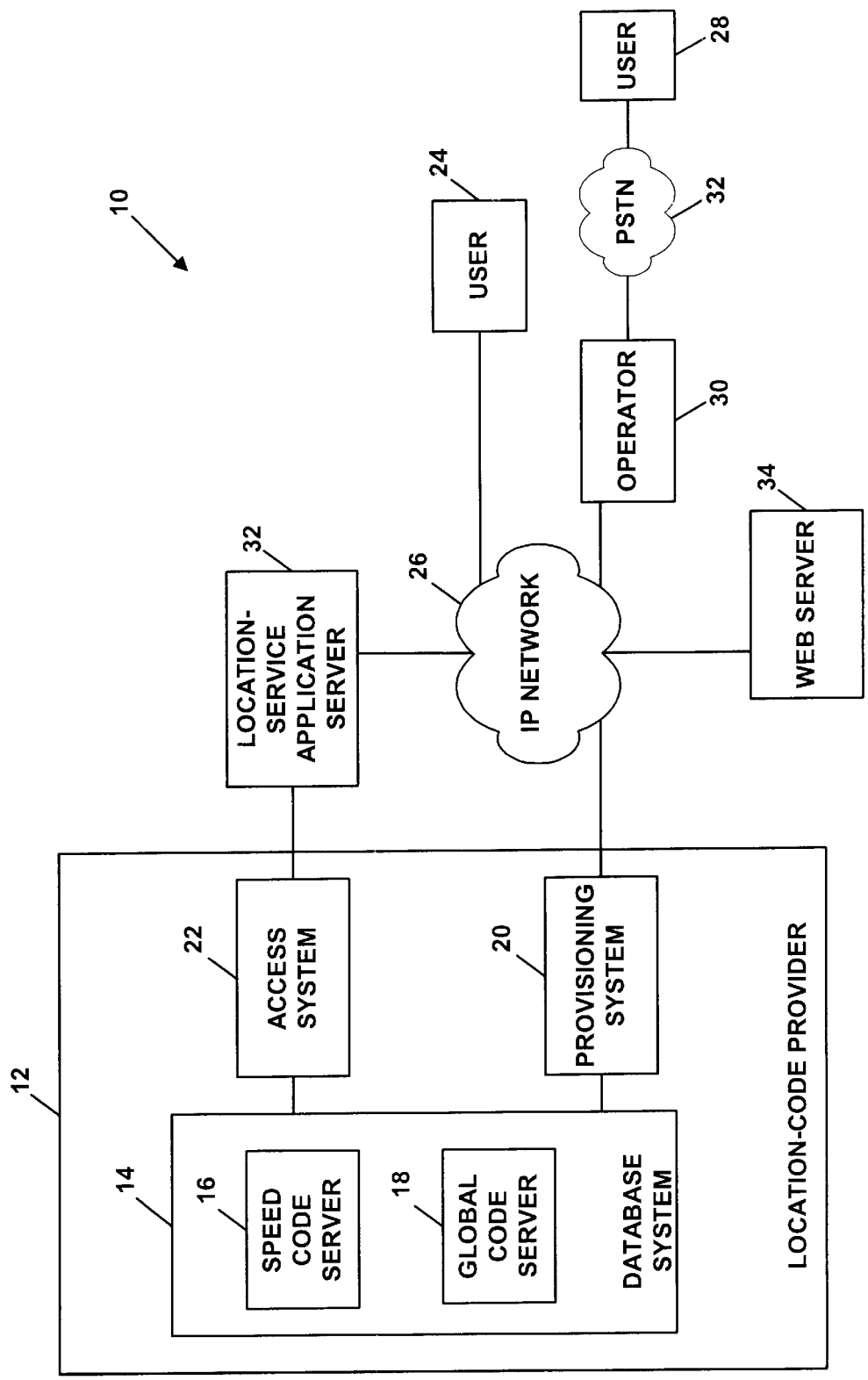
FIG. 1 is a simplified block diagram of a system arranged to employ the exemplary embodiment.

Referring to the drawings, FIG. 1 is a simplified block diagram of a system 10 for employing an exemplary embodiment of the present invention. It should be understood that this and other arrangements and processes described herein are set forth for purposes of example only, and other arrangements and elements (e.g., machines, interfaces, functions, orders of elements, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination and location.

As shown in FIG. 1, exemplary system 10 is shown to include a location-code provider system 12. The location-code provider system in turn includes an exemplary database system 14 comprised of a speed code database server 16 and a global code database server 18. Coupled with the exemplary database system 14 is a provisioning system 20 and an access system 22. The provisioning system may comprise an appropriately programmed server ("provisioning server"), and the access system may also comprise an appropriately programmed server ("access server"). Alternatively the provisioning and access systems could be combined onto a single server.

Generally speaking, the provisioning system 20 fictions as a gateway to the database system for purposes of setting up new location codes and/or otherwise managing the contents of the database system. In turn, the access system 22 functions as a gateway to the database system for purposes of retrieving from the database a location corresponding to a location code.

In the exemplary embodiment, a user at a user terminal can interface with the provisioning system via a communication channel. As shown by way of example in FIG. 1, for instance, a user at a terminal 24 can interface with the provisioning server via an IP network 26 such as the Internet. As another example, a user at a terminal 28 can interface with the provisioning server by calling an operator 30 via the public switched telephone network ("PSTN") 32 and having the operator interface with the provisioning system via IP network 26. Other arrangements are possible as well. (For instance, a user could interface with the provisioning system directly via the PSTN.)

As further shown, a location-based service ("location service") is provided on a suitably programmed application server 32 or in some other form. By way of example, application server 32 is shown coupled to IP network 26 and to access system 22. Thus, in this arrangement, a user at terminal 24 or terminal 28 could interface with the location-service via the IP network. And the location-service can interface with the access system. Again, other arrangements are possible as well. For instance, the location-service could be provided at some other location or in some other form.

In the exemplary embodiment, a "location code provider" company or other entity can own and operate the location-code provider system 12, or portions of that system. And a "location-based-service provider" company or other entity could own the location-service on application server 32. That way, the location-code provider can maintain control over, and manage, the location codes. Alternatively, the location service could be provided by the location-code provider, in which case, application server 32 might be situated within block 12. Other arrangements are possible as well.

Further shown coupled with IP network 26 is another web server 34. This web server could host personal or business web sites. Such a web site could function as a gateway to location service 32 and/or provisioning system 20, through application of a suitable hyperlink.

2. Exemplary Database System

In accordance with an exemplary embodiment, database system 14 can be made up of a number of tables on one or more servers, whether as a single database or multiple databases. Further, the database system can be replicated and/or distributed for fault tolerance or to ease access.

For example, the database system can be arranged to include two tables, (i) a User Table, and (ii) a Global Table. The records in the User Table can be related to the records in the Global Table (as in a relational database), through one or more common parameters, such as a global location code for instance. In the exemplary embodiment, the User Table and Global Table can have the following fields:

USER TABLE
  (a) User ID—unique identification of the user (or group of users)
  (b) Speed Code—user-specific location-code associated with a location
  (c) Global Code—general location-code associated with the given location
  (d) Location Name—plaintext name the given location GLOBAL TABLE
  (a) Global Code—general location-code associated with the given location
  (b) Latitude—latitude of the location
  (c) Longitude—longitude of the location
  (d) Last time accessed—the last time the global location record was accessed In the exemplary embodiment, speed codes and global codes can be distinguished from each other in some way such as by length, so that a system provided with a code can determine whether the code is a speed code or a global code. For instance, all speed codes could be restricted to be 3–4 characters, while all global codes could be 10 or more characters. (As a particular example, every global code could be a combination of the latitude and longitude numbers corresponding to a respective location, padded if necessary so that the total length of the global code is at least 10 digits. In that case, the separate latitude and longitude coordinates listed in the Global Table could be omitted. Other examples are possible as well.)

The User Table and Global Table could be stored in various locations. For instance, the User Table and Global Table could be stored on a common platform, such as on a client station or on a network server. Alternatively, the User Table could be stored on one platform, and the Global Table could be stored on another platform. As an example, the User Table could be stored in a data file on a client station (and could therefore be accessible to a client application) and the Global Table could be stored in a data file on a network server (and could therefore be more generally accessible). As still another example, the User Table could be stored on a corporate LAN server and the Global Table could be stored on a network server located elsewhere on the Internet.

For purposes of this description, but without limitation, the User Table can be assumed to be stored on the speed code server 16, and the Global Table can be assumed to be stored on the global code server 18. As shown in FIG. 1, both of these database servers may be accessible via provisioning system 20 and access system 22. Alternatively, the servers could be accessed via any other desired channels.

The database system, however, can vary from that described above and shown in FIG. 1. For example, the database system can be arranged as one table, in which each record has the following fields:

(a) User ID—unique identification of the user (or group of users)
(b) Speed Code—user-specific location-code associated with a location
(c) Latitude—latitude of the location
(d) Longitude—longitude of the location
(e) Location Name—plaintext name of the location
(f) Last time accessed—the last time the global location record was accessed Still further, other fields, field definitions, tables, and database relationships are possible as well. For example, a User Table could correlate each user to a Group Table, and the Group Table could then define Global Codes that correspond to the speed codes for the users in a given group. As another example, the specific fields listed above could be varied, such as by omitting one or more fields, combining fields together, adding other fields, or otherwise altering the fields. For instance, although latitude and longitude are listed as separate fields, the two could be combined together as one field. Further, the "location" indicated by the database system could take a form other than geographic location coordinates. Still further, in addition to (or instead of) a plaintext location name, the database could include a field that designates an image corresponding to the location, such as a corporate logo or photo image for instance, and the database could store each associated image.

3. Overview of Operation

In operation, a user will access a location-based service, such as that provided on application server 32. In order for the location service to function (i.e., to provide a service based on location), the location service must be provided with a location. In the exemplary embodiment, the user will specify a location by specifying a location code, such as a speed code or a global location code. If the user specifies a speed code, the application server will refer to the User Table to convert the speed code to a global location code, and the application server will then refer to the Global Table to convert the global location code to location coordinates. Alternatively, if the user specifies a global location code, the application server will refer to the Global Table to convert the global location code to location coordinates. The application server will then use the location coordinates as a basis to provide a location service.

4. Provisioning Location Codes

A variety of procedures can be employed in order to populate the database system 14 with location codes. In the exemplary embodiment, for instance, a user or other entity may populate the User Table with entries by selecting one or more locations, providing a name for each location, and selecting a speed code for each location. The user may do this by interfacing with provisioning system 20 or with another suitable provisioning system.

The provisioning system may take various forms. For example, the provisioning system may comprise a web site that can be accessed directly (e.g., by browsing to the site) or from another web site (e.g., through a suitable CGI or Java script). For instance, provisioning system 20 can host a provisioning web site having a designated address on IP network 26, and web server 34 could host another web site that includes a link to the address of the provisioning web site. The provisioning server can be coupled with speed code server 16 and with global code server 18 and can be programmed to access the User Table and the Global Table, so as to facilitate setting up or modifying location codes.

Alternatively, the provisioning system may provide an operator-center or interactive voice response unit (IVRU) that users could call (via a toll-free number, for instance). For instance, operator station 30 shown in FIG. 1 could be part of provisioning system 20; alternatively, provisioning system 20 could include a separate operator center or IVRU that is accessible at a designated telephone number. The operator site or IVRU could then be coupled with the database servers described above, to facilitate setting up speed codes in a similar manner. Other examples are possible as well.

The process of provisioning location codes can take various forms. To help illustrate, FIG. 2 provides a flow chart depicting the functions that could be performed by an exemplary provisioning web site, hosted by provisioning system 20. As noted above, this and other figures are set forth for purposes of example only, and variations are possible. For instance, various functions can be modified, combined or omitted, additional functions can be added, and the order of the functions could be changed.

Referring to FIG. 2, at block 52, for instance, when a user visits the provisioning site, the site prompts the user for a User ID (and password), and the user provides the User ID (and password). At block 54, with the User ID, the site then queries the User Table to find all records for the User. At block 56, the site determines if any such records exist. If any records exist, then, at block 58, the site responsively presents the user with a list of the speed codes and corresponding location names (and/or images) that have been established for the user. Alternatively, if no such records exist for the user yet, then, at block 60, the site advises the user accordingly. The site then prompts the user to modify or add speed code entries.

To facilitate adding a new speed code entry, for instance, the exemplary provisioning site could include a hyperlink or other mechanism that leads the user to a list or outline of locations, possibly classified by subject matter (e.g., restaurants, pizza restaurants, hot dog stands, etc.) or in some other way. The list could describe each location by formal name and address, such as "McDonald's restaurant, 125 S. George Street, Pineville, Ky." and could further include a representative logo or picture associated with the location (such as the "golden arches" McDonald's logo, for instance). Thus, at block 62, the site could present this list of available locations to the user. The site could be programmed with the location coordinates corresponding to each listed location, although those coordinates will preferably be hidden from the user's view.

In the exemplary embodiment, at block 64, the user then selects a desired location from those presented. At block 66, in response to the user's selection of the location, the site then prompts the user for a name by which the user would like to refer to the location, and the user selects or provides a desired name. Alternatively, the site could accept the formal name by default if the user does not specify another name. At block 68, the site then stores the user's User ID and selected location name in a new record in the User Table. Further, if the speed code database allows for storage of an image associated with a location, the provisioning site also stores in the database the representative logo or picture associated with the location (if provided). Alternatively, the site could prompt the user to provide another desired image to be associated with the location.

At block 70, the exemplary provisioning site will then prompt the user to specify a speed code to be associated with the designated location, and the user will specify a speed code. If the site has a list of the speed codes already established for the user, the site could suggest a next available speed code in numerical order and could allow the user to signal approval of the suggested speed code. Alternatively, the site could accept another speed code entered by the user. In the exemplary embodiment, the site could restrict the length of the speed code to three or four characters, as described above. At block 72, the site could then store the selected speed code in the new User Table record as well.

Given the location coordinates of the selected location, the exemplary provisioning site will then determine if the location selected is already listed in the Global Table, such that a global location code already exists for the location. In particular, at block 74, the provisioning site may query the Global Table to find if any Global Table entry lists the location coordinates. If the provisioning site finds such an entry, at block 76, the provisioning site will then retrieve the global code from the entry and store the global code in the User Table record. Alternatively, if the provisioning site finds that such an entry does not exist, then, at blocks 78, the site will create a new record for the location in the Global Table and, at block 80, the site will store the associated global code in the User Table record.

As noted above, the provisioning system can be accessed directly or in some other manner. As examples, a user could access the provisioning system as a service provided by a directory assistance center, a web service provider, or a carrier that knows or can determine the user's current location. These entry points are illustrated in FIG. 1 by blocks A, B and C respectively.

For instance, when a user calls directory assistance to obtain a telephone number or address of a given party, the directory assistance operator (or automated system) could prompt the user to create a speed code for the party. For example, assume that the user has called directory assistance to get information about the McDonald's restaurant noted above. The directory assistance center could switch the user to an IVRU, possibly hosted by the location-code provider company (e.g., as part of provisioning system 20, coupled to the operator via a voice over IP channel over network 26), which could ask whether the user would like to create a speed code for that restaurant.

If the user wants to, the IVRU could then carry out a provisioning process like that noted above, prompting the user for information via voice commands or other entry mechanisms. If the IVRU allows a user to speak a description of a location, the IVRU may be arranged to convert that description into text and then store the text description in the database. Alternatively, the database system might provide a field for storing a digitized voice signal associated with the speed code, so the platform might store that digitized voice signal in the database, rather than converting the voice to text and storing the text.

Similarly, assume that a user is visiting a McDonald's web site, hosted by server 34, for instance. The web site could provide a "Create Location Code" hyperlink button, which, when selected by the user, could cause the McDonald's web site to execute a script so as call up the location code provisioning site described above. The script could pass to the provisioning site an indication of the McDonald's restaurant name and location coordinates. And the provisioning site can then work as described above, allowing the user to select a speed code and a reference name for the location.

In accordance with the exemplary embodiment, the location-code provider company can distribute a "Create Location Code" button graphic and associated script code for use on third party web sites. With this arrangement, the "Create Location Code" link could be displayed on many web pages, thereby enabling increased use of the location code system.

Further, if a user is operating a client station that is currently located at a given position, and if the user is communicating with a service that can determine the current position, the service could allow the user to set up a speed code for the user's current location. For instance, a telecommunication service provider can readily determine the location of a landline or wireless terminal that a user is operating. (Recent advances in location technology have enabled cellular wireless carriers to identify the location of mobile stations, such as cellular telephones, personal digital assistants, etc., with great precision. Further progress in this area is expected as well.) The service provider, or an authorized third party service provider, can set up a service by which a user can establish a speed code for the user's current location.

For example, if a user is operating a cellular telephone equipped with a microbrowser application, the user could browse to a web site operated by the user's cellular carrier. The web site can present the user with a choice (e.g., via a choice card or other mechanism) to establish a speed code for the user's current location. When the user makes that choice, the web site can determine the user's current location (by reference to a mobile positioning center, location server, or other entity) and then prompt the user for a speed code and name to use for the location. The web site can then set up the speed code, as described above. A similar process can be accomplished through other communication channels, such as by telephone for instance.

It should be understood that the speed code provisioning system could take still other forms as well. For example, in an alternative embodiment, the provisioning system (e.g., provisioning web site) could include logic that causes a user's speed codes and corresponding plaintext descriptions to be stored on the user's client terminal. Each time the user visits the provisioning web site or changes the list of speed codes, the web site can then autonomously (or at the user's request) store a cookie or other file on the user's computer, providing a list of the user's speed codes and corresponding descriptions.

5. Using Location Codes

As noted above, a user can use a speed code to facilitate a location-based service, by providing the speed code to a location-based-service provider. The service provider can take various forms, and the user can access the location-based service through various mechanisms. For instance, as described above, the location-service may be Internet-based, so that the user could browse to the service from a landline or wireless terminal equipped with a web browser. Alternatively, the location-service may be telephone based (e.g., at an operator center, which may include operator station 30), so that the user could access the service by calling a designated telephone number. Other examples are possible as well.

The process of providing a speed code to the location-based service could take various forms. For example, once the user accesses the location-service, the service could prompt the user to indicate a location and could allow the user to do so by providing a speed code. The user could then responsively provide the speed code.

By way of example, FIG. 3 provides a flow chart depicting the functions that may be involved in using a speed code, where the location-service 32 is Internet-based and the user is operating a browser-equipped client station by which the user has accessed the service. Again, these functions are shown and described for purposes of example only, and many variations are possible. Further, analogous functions can be performed in other scenarios (e.g., through telephone access) as well.

Referring to FIG. 2, at block 100, for instance, the location-service first sends to the user's browser a web page (e.g., an HTML page or an HDML choice card) that displays an "Enter Location Code" option or the like. (By analogy, in a telephone based system, the location-based-service provider could employ an IVRU to prompt the user for that selection.) At block 102, the user selects that option, indicating a desire to specify a location by providing a location code.

The service then prompts the user to specify a location code, and the user specifies a location code. In obtaining a location code from a user, the an exemplary service can allow the user to enter a desired location code or to request a list of speed codes that are available for the user, as shown at block 104. For instance, the service may provide a text entry box or card for the user to specify a location code, and the service may provide a button for the user to select so as to indicate a request to see a list of available speed codes for the user.

If the user requests a list of available speed codes, then, at block 106, the service will ask the user to provide a User ID, to facilitate correlation with speed code entries. Alternatively, rather than having the user expressly indicate a User ID, the service could identify the user, perhaps with the assistance of a telecommunications carrier, based on the identity of the user's terminal or based on a session ID for instance.

Provided with the User ID, at block 108, the service will then query the User Table, by reference to the User ID, so as to obtain a list of all speed codes and associated names (and/or images) that are currently set up for the user. For instance, the service could send a message to the access system 22, asking the access system to provide a list of speed codes associated with the designated User ID. In response, access system 22 could query the User Table and return a list of available speed codes and associated names and global codes, and perhaps the associated location coordinates.

At block 110, the location-service may present the list of the associated names to the user and allow the user to select a location from the list. To do so, the location-service could send to the user's terminal a "Select Location" web page (e.g., HTML page or HDML card), which lists some or all of the user's available speed codes by name. At block 112, the user may then select a desired item from the page. In response, the browser would send a signal to the location-service, indicating the selected item.

The page could be programmed with the speed code corresponding to each location listed on the page, in which case the signal that the browser sends to the service could indicate the speed code. Alternatively, the service could otherwise correlate the selected item with the user's corresponding speed code. Still alternatively, the description (name) of the location selected by the user could be considered the user's specific code for that location. So that description could be returned as the speed code.

At block 114, the service could then correlate the speed code with the corresponding global code, if the service received the corresponding global code from access system 22. Alternatively, the service could send the speed code to the access system and ask access system 22 to provide the global code.

Provided with the global code, at block 116, the location-service may identify the location coordinates corresponding to the global code. For instance, the service could send a message to the access system 22, asking the access system to provide location coordinates corresponding to the global code. In response, the access system could query the Global Table and return location coordinates.

Alternatively, the user may opt to enter a location code, as indicated at block 118, rather than selecting one from a list. In response, the location-service may send a message to access system 22, seeking the corresponding location coordinates. In turn, at block 120, the access system will determine whether the entered code is a speed code or is a global location code. If codes are distinguished by length as described above, for instance, this can be done by determining the length of the entered code and then concluding that the code is either a speed code or a global code. If the code is a speed code, then the access system could determine the global code by reference to the User Table, as shown at block 122. The access system could then determine the location coordinates by reference to the Global Table, as shown at block 124. Or if the code is a global code, then, at block 126, the access system could determine the location coordinates by reference to the Global Table. The access system could then report the corresponding location coordinates to the location-service.

Further, if the user's terminal has a local copy of the user's speed codes and corresponding plaintext descriptions, the user could invoke an application (i.e., a client application or a server application) that reads the local copy and presents the user with list of the codes and/or descriptions. The user may then readily select an entry from the list and provide the corresponding speed code to the location-service. For instance, the application may automatically transmit the speed code to the location-service. Alternatively, the application may present the speed code to the user, and the user may manually communicate the speed code to the service. The service can then translate the speed code into location coordinates, by reference to the User Table and Global Table for instance.

Once the location-service has identified the location coordinates that correspond to the code selected by the user, the location-service may then continue, providing a service based on those location coordinates, as indicated at block 128. For example, the location-based service may invoke a mapping engine to provide the user with a map of the location. As another example, provided with the user's current location and a location of another entity, the service could invoke a routing engine to provide a user with a plan for travel between the user and the other entity. As still another example, the service could provide the user with weather or traffic reports for the designated location.

As another example, a user may call or otherwise access a voice-command platform (such as a VXML-based web site, or an IVRU accessible by telephone for instance), and the platform can prompt a user to select a location service, such as a business-locator or other service. Once the client selects the service, the platform could prompt the user to speak a voice description that has been associated in the database with a speed code for a particular business, and the platform could responsively get the corresponding location from the location-code system as described above.

In this scenario, if the database has only text versions of location descriptions, the platform might convert the spoken description to text, and that text can be used as a user-specific code (i.e., a speed code) to search for the location. Alternatively, if the database has a voice description (such as a digitized voice signal) corresponding to various locations, the spoken voice description can be used as a user-specific code (i.e., a speed code (e.g., a "voice speed code")) to search the database for a corresponding location. Other examples are possible as well.

6. Database Maintenance

As noted above, the database system (e.g., the Global Table) can associate with each location code a field that indicates the last time the code was accessed. This field can be updated with the current date each time the location code is used. In the exemplary embodiment, provisioning system 20 can be programmed to periodically review the database system and to delete location code records that are older than a predetermined time period (such as a year). When a global code is deleted, all speed codes that refer to the global code would preferably be deleted as well. This way, a location code provider can manage the size of the database system.

7. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A method of determining a location for use in a location-based service, the method comprising:

querying database system to obtain a number of available location codes;

presenting the available location codes to a user;

prompting the user to select one of the presented available location codes;

receiving a user selection of a first location code from the presented location codes querying a database system to determine a location corresponding to the first location code selected by the user; and outputting an indication of the location, wherein the database system defines images associated with the available location codes, and wherein presenting the available location codes to the user comprises presenting the images to the user.

2. The method of claim 1, wherein presenting the available location codes to the user is done by presenting the user with descriptions corresponding to the available location codes, wherein a user-selection of a given presented description defines a user-selection of a corresponding location code.

3. The method of claim 1, further comprising receiving a User ID, wherein querying a database system to determine a location corresponding to the first location code comprises:

querying the database system to determine a location corresponding to a combination of the first location code and the User ID.

4. The method of claim 3, wherein querying the database system to determine a location corresponding to a combination of the first location code and the User ID comprises:

querying the database system to determine a second location code corresponding to the combination of the first location code and the User ID; and querying the database system to determine a location corresponding to the second location code.

5. The method of claim 1, further comprising:

determining whether the first location code is a user-specific code or a global code.

6. A method comprising:

performing the method of claim 1;

receiving the indication of the location; and using that indication to perform a service based on the location.

7. The method of claim 6, wherein the service is selected from the group consisting of (i) a mapping service keyed to the location, (ii) a routing service keyed to the location, (iii) a weather reporting service keyed to the location, and (iv) a traffic reporting service keyed to the location.

8. The method of claim 6, wherein the indication comprises geographic coordinates.

9. A method of determining a location for use in a location-based service, the method comprising:

receiving a first location code;

querying a database system to determine a location corresponding to the first location code;

identifying a length of the first location code;

using the length as a basis to determine whether the first location code is a user-specific code or a global code; and outputting an indication of the location.

10. The method of claim 9, further comprising:

in response to a determination that the first location code is a user-specific code, determining from the database system what location corresponds to the first location code for a particular user.

11. A method of determining a location for use in a location-based service, the method comprising:

recording in a database system a user-specific description of a given location;

recording in the database system a correlation between the user-specific description and the given location;

thereafter receiving from a user the user-specific description;

querying the database system to determine a location corresponding to the user-specific description received from the user; and outputting an indication of the determined location.

12. The method of claim 11, wherein the user-specific description comprises a numeric code.

13. The method of claim 11, wherein the user-specific description comprises a text description, and wherein querying the database system to determine a location corresponding to the user-specific description comprises:

querying the database system to determine a location corresponding to the text description.

14. The method of claim 11, wherein the user-specific description comprises a voice description, and wherein querying a database system to determine a location corresponding to the user-specific description comprises:

querying the database system to determine a location corresponding to the voice description.

15. A location-code system comprising:

a database system defining relationships between location-codes and locations;

a provisioning system for establishing location-codes in the database system, wherein, through the provisioning system, the database system receives a user-specific location-code as a description of a given location and stores a correlation between the user-specific location-code and the given location; and an access system for using the database system to determine locations corresponding to location-codes, wherein the access system receives the user-specific location-code and queries the database system to retrieve the given location corresponding to the user-specific location-code.

16. A method comprising:

identifying a geographic location;

thereafter receiving from a user a user-specific code to designate the geographic location, and storing in a database system an indication of the geographic location and an indication of the user-specific code designating the geographic location; and thereafter (i) receiving from the user the user-specific code, (ii) querying the database system to retrieve the stored geographic location designated by the user-specific code, and (iii) using the retrieved geographic location as a basis to perform a location-based service for the user.

17. The method of claim 16, wherein identifying the geographic location comprises:

presenting a list of locations to the user, each location having corresponding geographic coordinates;

receiving from the user a selection of a location from the presented list of locations; and identifying, as the geographic location, the geographic coordinates corresponding to the location selected by the user.

18. The method of claim 16, wherein identifying the geographic location comprises:

determining a position of a client station operated by the user; and identifying, as the geographic location, the determined position of the client station.

19. The method of claim 16, wherein the location-based service comprises a service selected from the group consisting of (i) a mapping service keyed to the location, (ii) a routing service keyed to the location, (iii) a weather reporting service keyed to the location, and (iv) a traffic reporting service keyed to the location.

* * * * *